Oct. 5, 1965  H. L. NG  3,210,091
CART FOR TRANSPORTING AND STORING GARDEN IMPLEMENTS
Filed July 9, 1963
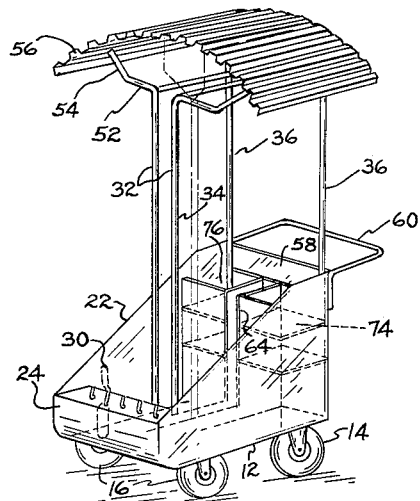
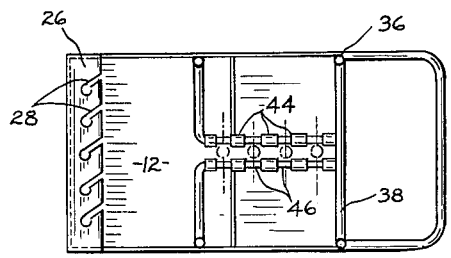
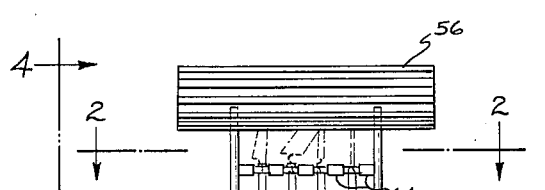
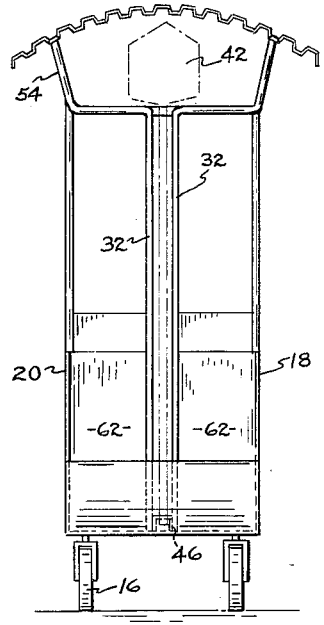
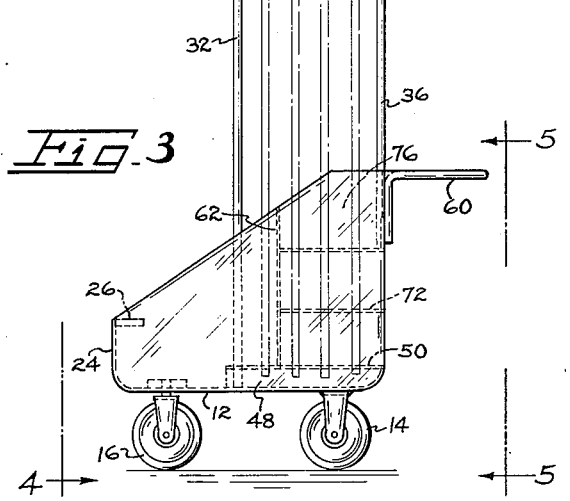
INVENTOR.
HELEN L. NG
BY
Townsend and Townsend
ATTORNEYS United States Patent Office 3,210,091
Patented Oct. 5, 1965

3,210,091
CART FOR TRANSPORTING AND STORING
GARDEN IMPLEMENTS
Helen Louise Ng, 4295 Chileno Valley Road,
Petaluma, Calif.
Filed July 9, 1963, Ser. No. 294,798
5 Claims. (Cl. 280—47.35)

This invention relates to a cart for transporting and storing garden implements having either long handles or short handles, and includes structures for supporting the implements in readily accessible positions.

The specific embodiment of my invention to be described and shown in detail includes a base plate mounted on wheels or casters for rolling movement on a horizontal surface. Extending upwardly from the base plate are vertical side walls which form a compartment for small articles such as containers for fertilizer and insecticides. Also extending up from the base plate are tubular members for supporting a pair of parallel, spaced-apart horizontal bars which bars are adapted for supporting long handled implements such as rakes, shovels, and the like. The bars are spaced apart by an amount sufficient to permit free entry of the implement handles therebetween, but are sufficiently close to one another to support the head of the implement thereon. The tubular members that support the bars extend above the bars and provide support for a protective roof placed over the tool heads. A forward vertical wall terminates at its upper margin in a horizontal lip in which are formed a plurality of notches for receiving short handled implements such as trowels and the like.

It is well known that the modern home owner frequently must perform landscaping tasks over an extended period of time with frequent interruptions. Because it is time consuming to replace landscaping and garden implements in a suitable storage area each time the work is interrupted, the tools are often left out in the weather to become rusty and lost or stolen.

Therefore, it is an object of the present invention to provide a device for storing and transporting garden implements which device is highly mobile and has provisions for supporting the garden implements in an organized and readily accessible manner.

Another object is to provide such a device which protects the implements stored in it from adverse weather conditions. This object is achieved by providing a roof member over the device and is achieved economically since the roof member is supported by the members that form the tool racks.

Still another object is to provide a portable cart for gardeners which has a plurality of compartments for retaining small articles such as gloves, trimming shears and the like. This object is attained in the present invention by providing two groups of compartments that are accessible from the rear of the cart. The groups of compartments are spaced from one another to permit long handled implements to depend into the space between the compartments. Because a handle bar is provided at the rear of the cart, the compartments are conveniently accessible to the user of the cart.

Yet another object is to provide a cart of the type described that can be constructed inexpensively with a minimum number of parts. Attainment of this object is realized by making individual parts of the cart serve a plurality of functions. For example, the vertical tubular members that support a rack for long handled tools also support a protective roof for the tools; the vertical members that form the sides of the compartments support the tubular members as well as delineating the compartments.

A further object is to provide a garden cart which is portable and which has provisions for storing all implements normally required in landscaping operations. The factors of portability and storage of the implements in an organized manner conjoin to provide a cart which can be readily moved from a storage area, such as a garage, to the site at which the landscaping work is to be performed.

These and other objects will be more apparent after referring to the following specification and accompanying drawings in which:

FIGURE 1 is a perspective view of a cart according to the present invention;
FIGURE 2 is a plan view of the cart taken along line 2—2 of FIGURE 3;
FIGURE 3 is a side elevational view of the invention;
FIGURE 4 is a front elevational view of the invention;
FIGURE 5 is a partial rear elevational view of the invention taken along line 5—5 of FIGURE 3; and
FIGURE 6 is a fragmentary view in perspective of the tool rack and roof supporting structure of the invention.

Referring more particularly to the drawings, reference numeral 12 indicates a base plate that is supported for rolling movement on a floor or ground surface by a pair of rear wheels 14 and a pair of forward casters 16. Extending upwardly from the sides of the base plate 12 are opposing side walls 18 and 20, each of which has a downwardly, forwardly sloping upper edge 22. Edge 22 terminates at the forward extremity of the cart at an upwardly projecting wall 24. Front wall 24 can be integral with base plate 12 or it can be a separate piece secured to the base plate by welding or the like. At the upper edge of front wall 24 is a horizontal lip 26 in which is formed a plurality of notches 28 for receiving short handled implements such as a trowel 30. As clearly appears in FIGURE 2, slots 28 are angularly oriented relative to the normal direction of travel of the cart to prevent the implements stored in slots from being dislodged from the slots by vibration and acceleration of the cart.

Extending upwardly from the central portion of base plate 12 are a pair of thin rigid support members 32 which are spaced apart by an amount sufficient to permit entry therebetween of a shovel handle 34. At the rear of the cart a second pair of thin rigid members 36 extend upwardly from side walls 18 and 20. The thin rigid members 32 and 36 are preferably tubular aluminum. Spanning the rigid members 36 near their upper extremity is a horizontal bar 38. A pair of parallelly spaced-apart horizontal legs 40 extend from respective rigid members 32 to bar 38 and form a rack for supporting the implement heads, for example, shovel blade 42, thereon. Legs 40 are spaced apart sufficiently to afford free entry of implement handle 34 therebetween but are sufficiently close to support implement head 42 therebetween. A plurality of spacers 44 is provided on each horizontal leg 40 to define pockets 46 for supporting individual implement heads. I prefer to construct spacers 44 of resilient tubular material in order to prevent damage to the implement heads and rattling of the implements, and to afford adjustability of the size of implement pockets 46.

An inverted U-shaped channel member 48 is secured to the upper surface of the base plate 12 in vertical alignment with the space between horizontal legs 40. Channel 48 is apertured at 50 to receive implement handles 34 therein. This structure secures the implements against unwanted movement and dislodgment from pockets 46 during movement of the cart. In addition, channel 48 affords structural rigidity to base plate 12.

The upper extremities of these rigid members 32 are formed with horizontal transverse segments 52 and upwardly sloping segments 54, the outer ends of which form the forward supports for a roof 56. Thin ridged members 36 terminate somewhat above bar 38 in outwardly sloping segments to form rear support members for roof 56. The roof can be secured to the upper ends of the rigid members by any suitable technique such as welding or by use of threaded fasteners. Roof 56 is preferably corrugated to provide additional strength thereto. Because of the outwardly sloping portion 54 on thin rigid members 32, roof 56 can extend well beyond side walls 18 and 20 and thus afford protection from weather to the contents of the cart.

Spanning the upper portions of the rear edges of side walls 18 and 20 is a planar support member 58. Support member 58 can be secured to side walls 18 and 20 by welding, or can be constructed integrally with the side walls. A handle bar 60 is secured to support member 58 proximate the points of joinder between the support member and side walls 18 and 20. Handle 60 is vertically positioned so as to be at a convenient height for the user of the cart. Forwardly of planar support member 58 is a pair of transverse panels 62 having interior edges 64 which are parallelly spaced apart to permit entry of the handles therebetween. Extending rearwardly from each edge 64 is a pair of parallelly spaced-apart, longitudinal panels 66 which terminate at their rear edges by an attachment to planar support member 58. As can be seen best in FIGURE 5, the rear portion of the cart is divided into two compartments 68 and 70. The compartments may be split into smaller compartments by the provision of shelves 72 which extend from side walls 18 and 20 into longitudinal panel 66.

Shelves 74 are disposed above shelves 72 at a level coincident with the lower edge of planar support member 58. Open top compartments 76 are thus formed by shelves 74, side walls 18 and 20, transverse panels 62 and longitudinal panel 64. It will be obvious that the last mentioned panel members provide a structural rigidity to the structure in addition to delineating the various storage compartments.

Thus, I have provided a garden cart in which long handled implements are conveniently and securely stored on horizontal legs 40 and shorter handled implements are similarly stored in notches 28 on lip 26. Compartment 68, 70 and 76 provide spaces for small articles useful to landscapers. Roof 56 protects the contents of the cart against damage from rain and sun. The presence of handle 60, wheels 14, and casters 16 make the cart extremely mobile in use.

While one embodiment of my invention has been shown and described, it will be obvious that other adaptations and modifications can be made without departing from the true spirit and scope of the invention.

What is claimed is:

1. Apparatus for transporting and storing garden tools of the type having an elongate handle and a head secured to one end of said handle comprising a base, a plurality of wheels for supporting said base for rolling movement on a surface, a bar, means for supporting said bar in a horizontal position above said base, a pair of elongate tubular members secured at one end thereof to said base and extending vertically upwardly therefrom, said tubular members terminating at their upper extremities with mutually parallel horizontal legs secured to said bar, said horizontal legs being spaced apart by an amount sufficient to afford free entry of said tool handles therebetween at the end thereof remote from said bar and sufficiently close to support said tool heads thereto, a roof, and means projecting upwardly from said bar and said legs for supporting said roof above said horizontal legs by a distance sufficient to afford entry of tool heads between said roof and said horizontal legs.

2. A cart for transporting and storing garden implements of the type having thin elongate handles and a head secured to one end of the handle comprising a base, a plurality of wheels for supporting said base for rolling movement on a surface, a pair of parallel spaced apart side walls secured to said base and projecting vertically upwardly therefrom, a planar support member fixedly secured between said side walls and intersecting said side walls, first and second elongate thin rigid members extending upwardly from said side and planar support member at the point of intersection thereof, a horizontal bar extending between said first and second elongate thin rigid members, said bar being disposed above said walls and being spaced above said base by an amount greater than the length of the implement handles, third and fourth elongate thin rigid members extending upwardly from said base, said third and fourth elongate rigid members being spaced apart by an amount sufficient to permit free entry therebetween of the handles of said implements, a pair of horizontal legs extending from said third and fourth elongate thin rigid members to said bar, said legs being parallelly spaced apart by an amount sufficient to permit free entry therebetween of the handles of said implements and sufficiently near one another to support the heads of said implements thereon with the handles in depending relation thereto, means for forming individual implement pockets along said legs, a roof, and means for supporting said roof above said horizontal legs by a distance sufficient to afford entry of implement heads between said roof and said horizontal legs.

3. The invention of claim 2 in combination with means secured to said base for defining a plurality of implement handle receiving holes, said holes being aligned vertically below respective said implement pockets.

4. A cart for transporting and storing garden implements comprising a rectangular base plate, means for affording rolling movement of said plate upon a surface, a pair of side walls extending vertically upwardly from opposite edges of said base plate, a front wall secured between said side walls and extending upwardly from said base plate, said front wall having at the upper margin thereof a lip portion extending over said base plate for defining a plurality of implement supporting notches, first and second transverse panels extending inwardly from respective said first and second side walls in mutual coplanar relation, the inner edges of transverse panels being spaced from one another to afford free entry therebetween of handles of said implements, a pair of parallelly spaced apart longitudinal panels extending rearwardly from the edges of respective said transverse panels, at least one shelf extending from each said longitudinal panel to the respective side wall, a support member spanning the rear edges of said side walls, said support member being secured adjacent to the upper extremities of said side walls so as to afford rear access to said shelves, means for forming an implement rack above said base, said rack forming means being disposed above the space between said longitudinal panels to permit handles of implements in said rack to depend into last said space, and a roof secured to said rack for sheltering said base and implements in said rack.

5. In combination with a wheeled cart having an upwardly opening compartment formed by a bottom plate surrounded by at least a vertical planar support member forming an end wall and parallel spaced apart side walls intersecting said end wall, a rack for supporting long-handled implements with enlarged heads thereabove comprising first and second elongate rigid members extending upwardly from the intersection of said walls, third and fourth elongate rigid members spaced from said first and second elongate rigid members and extending from said bottom plate in parallel relation to one another and to said first and second elongate rigid members, said third and fourth elongate rigid members being spaced apart by an amount sufficient to afford free entry of the implement handles therebetween, a pair of substantially horizontal mutually parallel members spanning the distance between said first and third rigid members and said second and fourth rigid members, said horizontal members being parallelly spaced apart by an amount less than the width of the implement head and being spaced above said bottom plate by an amount greater than the length of said implement handles so that said head is supported upon said horizontal members with the implement handle depending therebetween, supporting members extending upwardly from said rigid members, and a roof panel secured to said supporting members in overlying spaced relation to said horizontal members for sheltering said implements.

References Cited by the Examiner

UNITED STATES PATENTS

| | | |
|---|---|---|
| D. 99,541 | 5/36 | Dean. |
| 1,962,454 | 6/34 | Meanor et al. |
| 2,963,165 | 12/60 | Steiner _____ 211—60 X |
| 3,145,031 | 8/64 | Wilkinson _____ 280—47.35 |

BENJAMIN HERSH, *Primary Examiner.*

A. HARRY LEVY, *Examiner.*